United States Patent [19]

Buckner et al.

[11] Patent Number: 4,516,380

[45] Date of Patent: May 14, 1985

[54] PORTABLE APPARATUS FOR FILLING AND CLOSING CONTAINERS

[75] Inventors: Leonard Buckner, Mount Eaton; William A. Foll, Sr., Wooster; Stephen W. Pesho, Dalton, all of Ohio

[73] Assignee: Euclid Spiral Paper Tube Corp., Apple Creek, Ohio

[21] Appl. No.: 419,599

[22] Filed: Sep. 17, 1982

[51] Int. Cl.³ .......................... B65B 3/00; B65B 7/28
[52] U.S. Cl. ...................................... 53/282; 53/298
[58] Field of Search ................ 53/276, 281, 282, 298, 53/329, 373

[56] References Cited

U.S. PATENT DOCUMENTS

| | | | |
|---|---|---|---|
| 2,972,216 | 2/1961 | Schmidt | 53/281 |
| 3,354,614 | 11/1967 | St. Clair et al. | 53/282 |
| 3,492,785 | 2/1970 | Mancini | 53/282 |
| 3,527,020 | 9/1970 | Mancini | 53/282 |
| 3,884,017 | 5/1975 | Butcher | |
| 4,092,817 | 6/1978 | Rist | 53/298 |
| 4,151,698 | 5/1979 | Müller et al. | 53/282 X |
| 4,176,507 | 12/1979 | Mancini | 53/329 X |
| 4,282,698 | 8/1981 | Zimmermann | 53/282 |

Primary Examiner—Horace M. Culver
Attorney, Agent, or Firm—Baldwin, Egan, Walling & Fetzer

[57] ABSTRACT

A compact portable apparatus for filling open ended preformed containers with a substance, such as liquid, and then heat bonding a thin flexible closure material to the periphery of the open end of the container, for sealing the latter, comprising a frame and a rotatable support thereon adapted to receive a plurality of the containers; a plurality of work stations are provided on the frame, adapted for coaction with a respective container mounted on the support, including a feed station for automatically feeding the containers one at a time onto the support, a filling station for inserting the substance into each of the containers, a sealing station for heat bonding the thin flexible closure to the peripheral lip of the filled container; but in readily peelable relationship therewith, and a discharge station for removal of the filled and sealed containers from the support. The apparatus includes power means for automatically indexing the support through a predetermined cycle, and for actuating the various procedures at or about the aforementioned work stations, to provide the desired end product of a filled and sealed, yet readily openable, container.

21 Claims, 20 Drawing Figures

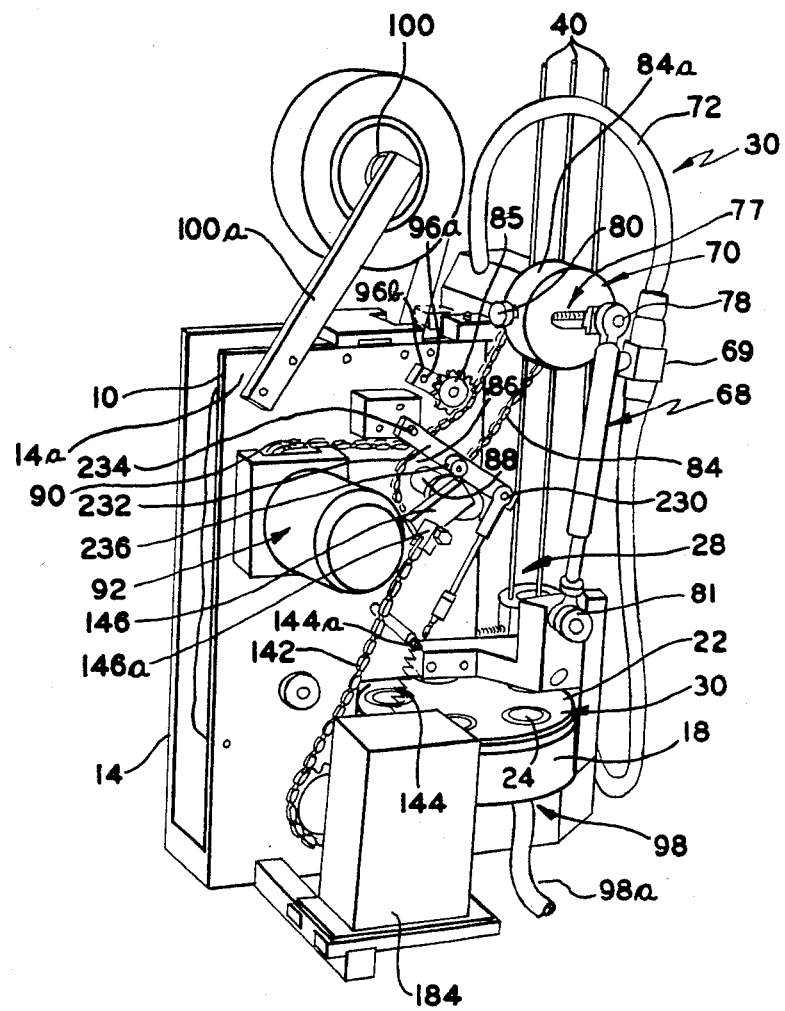
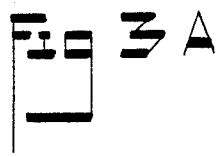

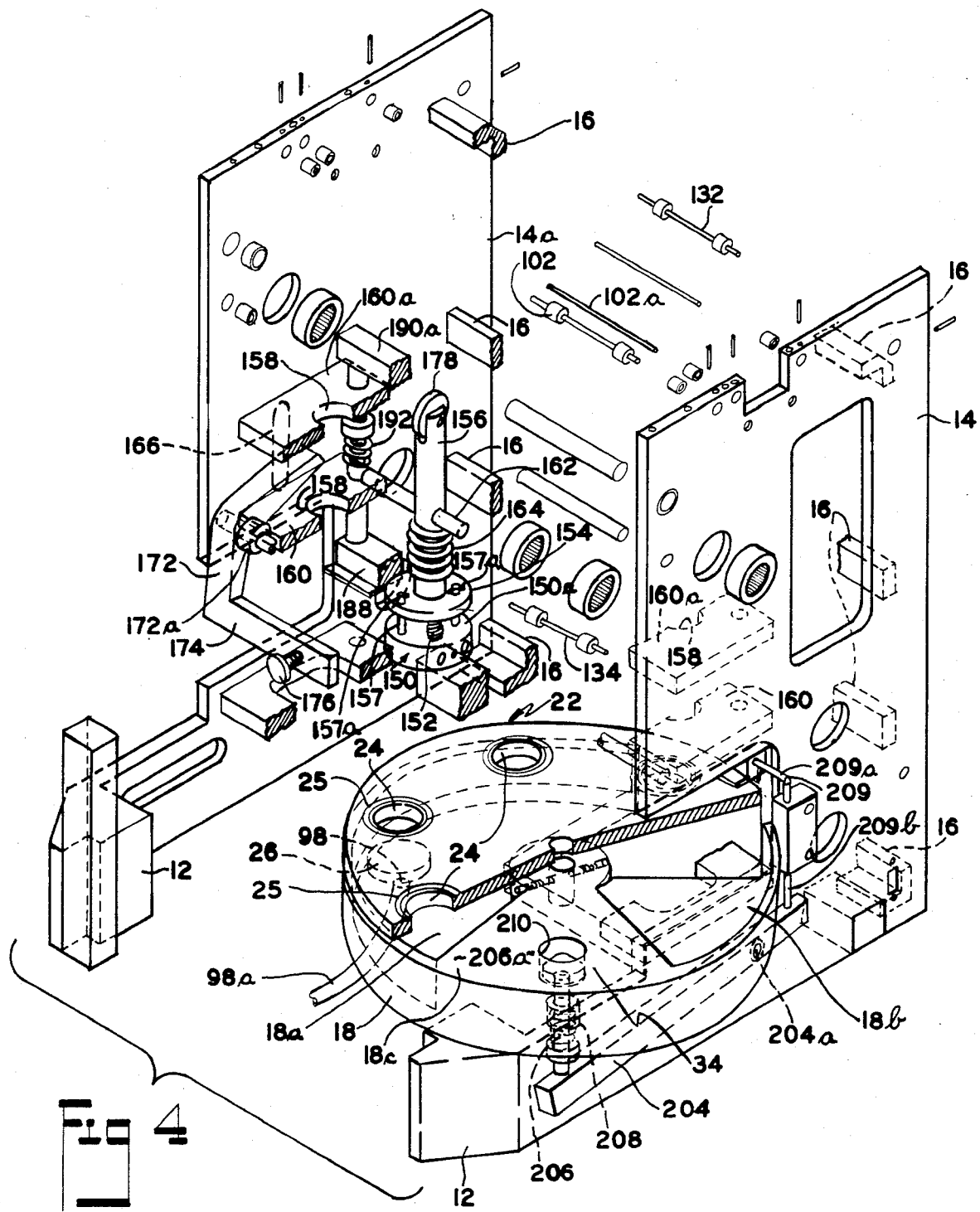

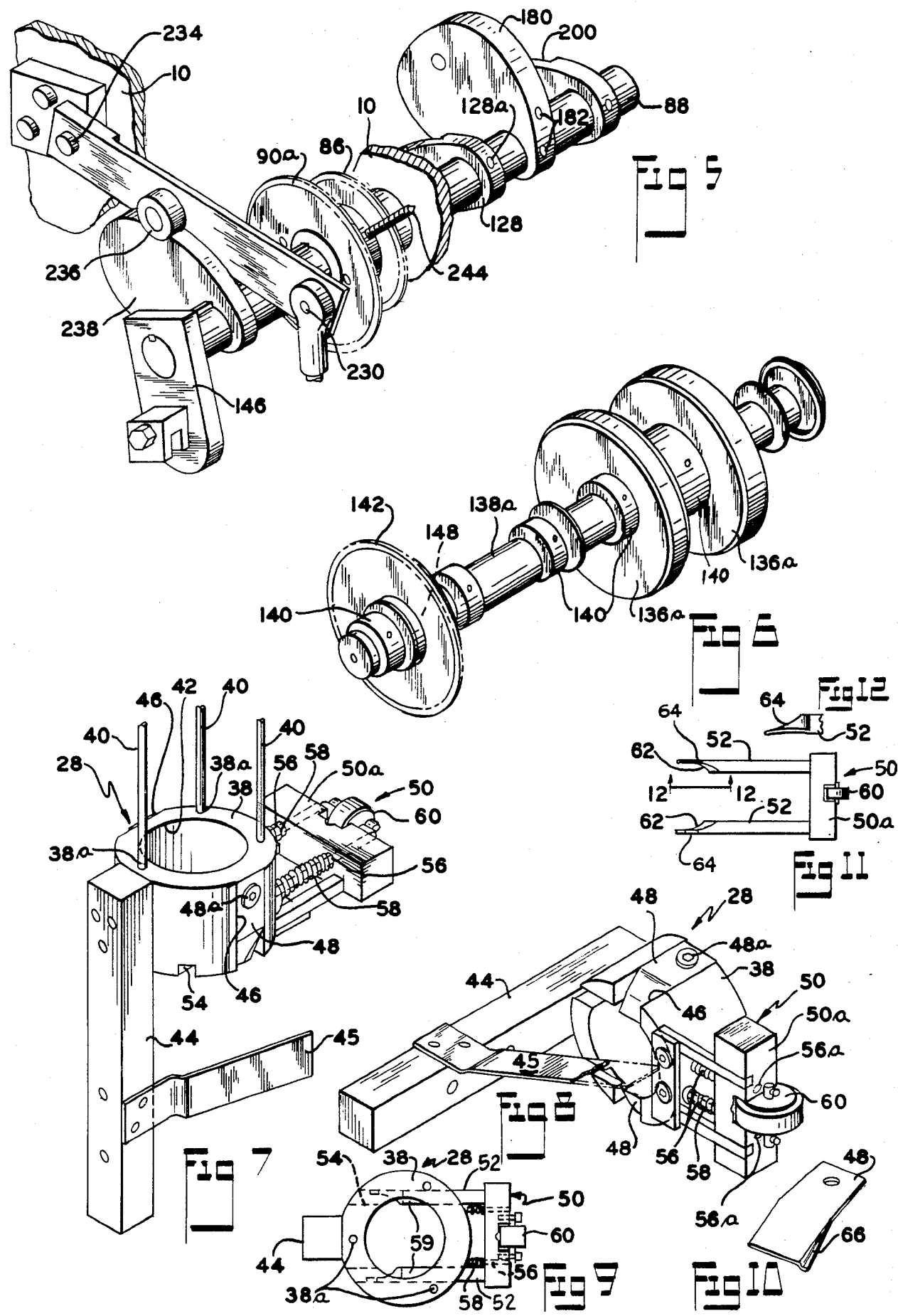

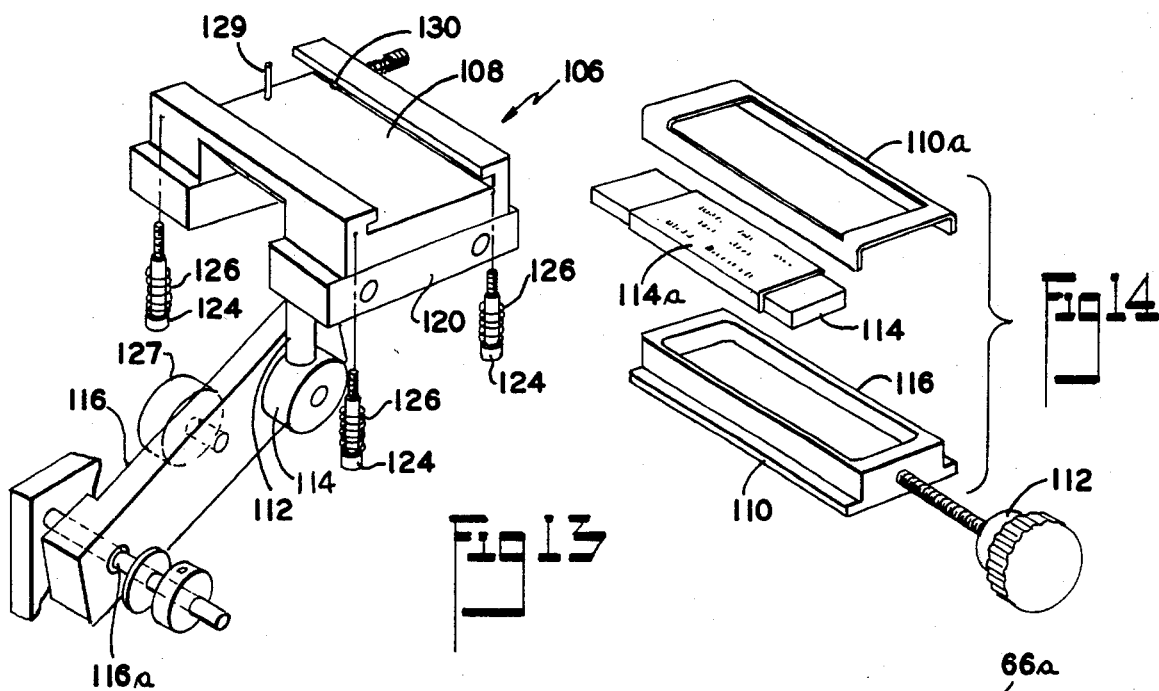
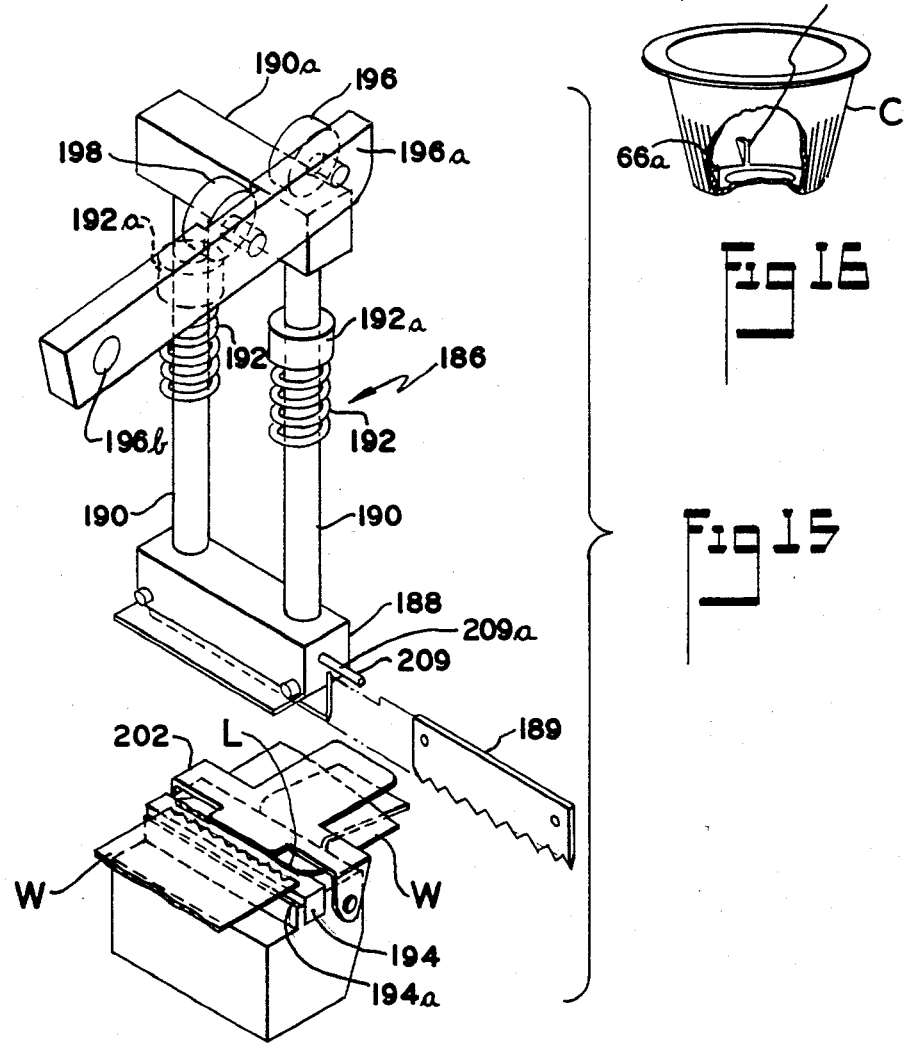

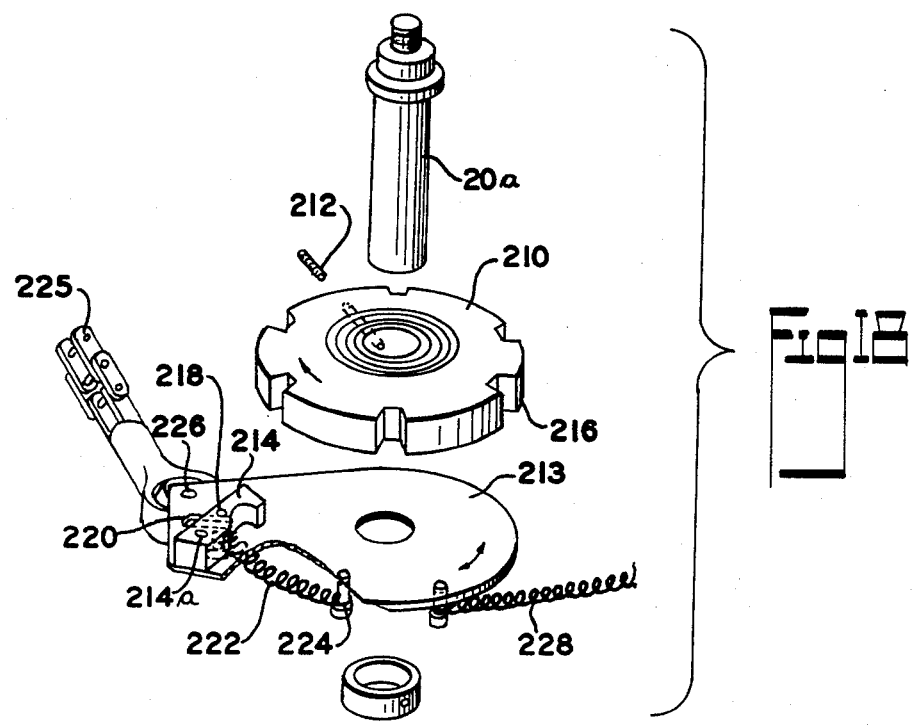
Fig 18
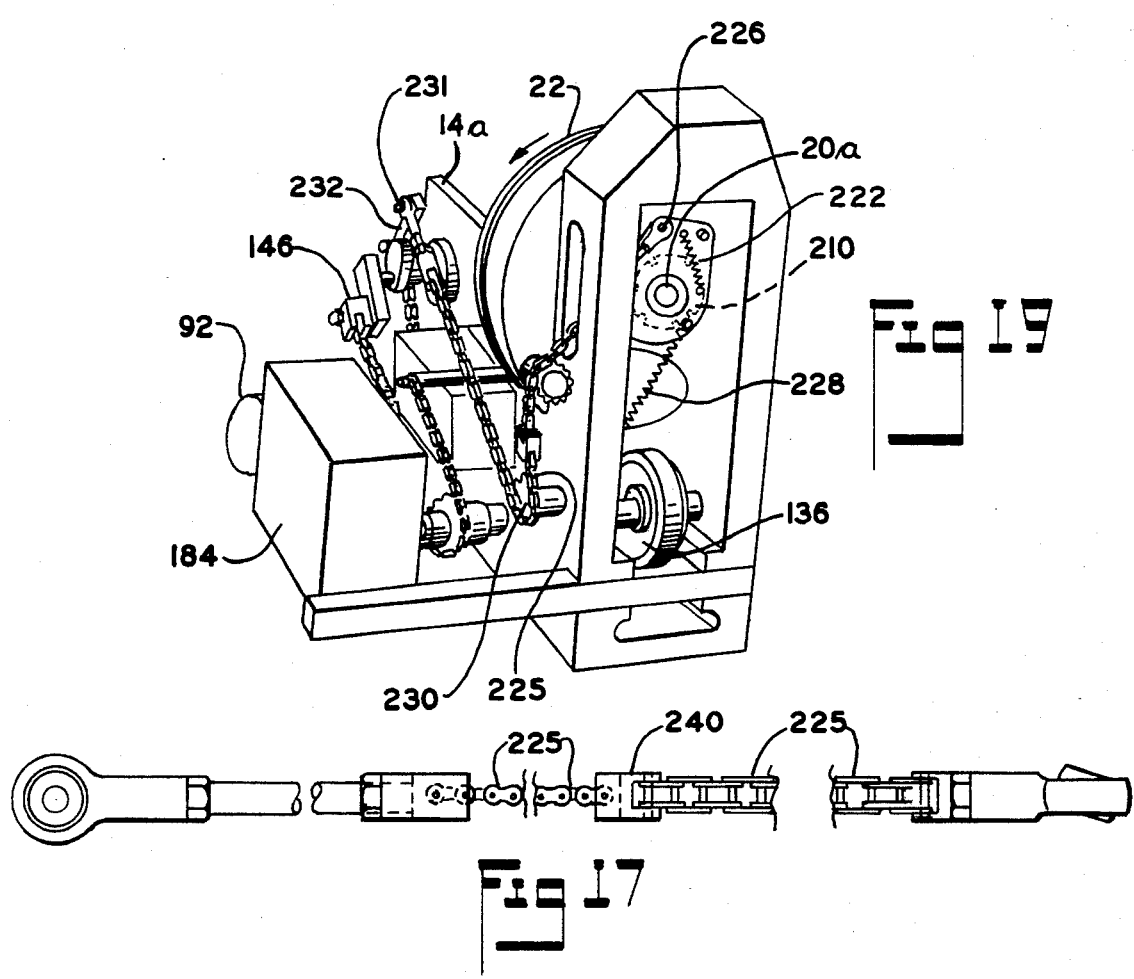
Fig 19
Fig 17

4,516,380

PORTABLE APPARATUS FOR FILLING AND CLOSING CONTAINERS

This invention relates to apparatus for filling open ended containers with a substance, and then heat bonding a thin flexible closure material to the periphery of the open end of the container to seal the latter, and more particularly relates to an apparatus of the aforementioned type which is of a compact, portable type and which will automatically insert the material into the open ended container and then will seal the same with a thin flexible closure material, which is heat sealed or heat bonded to the peripheral lip of the container, but which may be readily peeled therefrom to provide for opening of the container. The apparatus is then adapted to move the filled and sealed container to a position where it may be expeditiously removed from the apparatus. The apparatus is especially adapted for use in providing packaged medications, such as for instance at a medical clinic, or at a pharmacy, or the like.

BACKGROUND OF THE INVENTION

There are known in the art, considerable numbers of machines for filling and then closing containers. However, many of these mechanisms are unduly complex, or are of substantial size and weight and thus are not readily portable, or are unduly expensive, and thus are not practical for use in relatively small volume operations.

U.S. Pat. No. 3,884,017 issued May 20, 1975 to Peter E. Butcher, discloses one type of known machine utilizing an indexable web of closure material, adapted for being heat sealed to the periphery of an associated container.

SUMMARY OF THE INVENTION

The present invention provides a compact, portable apparatus for filling an open-ended plastic container with a substance, such as a medication liquid, and then heat sealing a thin flexible closure material to the periphery of the open end of the container, to seal the latter against loss of contents. The apparatus is expeditiously operable and is adaptable for use in providing a variety of volume filling operations for containers, and wherein the closure material is readily peelable from the container to open the latter, when it is desired to use the contents therein.

Accordingly, an object of the invention is to provide a novel compact portable apparatus for filling open-ended containers with a substance, such as for example, a liquid, and then sealing the same to retain the substance within the container.

Another object of the invention is to provide a novel apparatus for filling and sealing open-ended plastic containers, and wherein the apparatus comprises a frame, having a rotatable support for a plurality of the material receiving containers, and having a plurality of work stations on the frame, including a filling station and a sealing station coacting with the support, and including means for automatically indexing the support through a predetermined cycle to accomplish the filling and sealing of the containers at the respective work stations, and the subsequent removal thereof from the apparatus.

A still further object of the invention is to provide an apparatus of the aforementioned type which includes a printing mechanism thereon for automatically printing indicia on the flexible closure material utilized to seal the containers, prior to application thereof to the containers, and wherein the closure material is furnished in web-like compact form for application to the filled containers, for sealing the latter, and including means for automatically severing the container engaging sealing portion of the closure web from the remainder thereof.

A still further object of the invention is to provide an apparatus of the aforementioned type, which includes a frame having a plurality of work stations coacting with the rotatable support including onto the support, a filling station for entering the substance to be packaged into the containers, a sealing station for sealing the open end of the respective container with flexible closure material from a roll of such closure material, and for severing the remainder of the web of closure material from that portion sealing the container, a printing station for imprinting the web of closure material with indicia prior to its being applied to the filled containers, and a discharge station for automatically removing filled and sealed containers from the apparatus support, together with the means for automatically indexing the support through a predetermined cycle and automatically accomplishing the various work operations at the respective stations.

Other objects and advantages of the invention will be apparent from the following description taken in conjunction with the accompanying drawings wherein:

BRIEF DESCRIPTION OF THE DRAWINGS

FIG. 3A is a reduced size perspective view taken from the opposite side of the apparatus as that of FIG. 1.

FIG. 4 is an exploded, generally perspective, partially broken view showing the frame and rotatable support table of the apparatus, together with various other of the operating components of the apparatus;

FIG. 5 is a perspective view of the rotatable power shaft and associated power components mounted thereon, which drive the various mechanisms at the respective work stations of the apparatus.

FIG. 6 is a perspective view of the rotatable power shaft and associated power components mounted thereon, which accomplish advancement of the web of flexible sealing material for closing the containers after the filling of the containers with liquid substance.

FIGS. 7, 8 and 9 are respectively perspective views and a top plan view of the feeding mechanism for containers, at the aforementioned container feeding work station of the apparatus.

FIG. 10 is an enlarged, generally perspective view of one of the spring leaf fingers of the container feeding station illustrated in FIGS. 7-9, that controls the sequential individual feeding of a column of the containers at the work feeding station onto the underlying rotatable support of the apparatus.

FIG. 11 is a bottom plan view of the reciprocal releasing and support control member of the feeding station of FIGS. 7-9;

FIG. 12 is a fragmentary view of the free end of one of the arms of the control member of FIG. 11, taken generally along the plane of line 12—12 of FIG. 11, looking in the direction of the arrows, and illustrating the cam surface on such arm which are adapted to coact with the spring finger illustrated in FIG. 10.

FIG. 13 is an enlarged perspective view of the movable platen of the printing mechanism, and associated drive thereof, for imprinting the web of sealing material with selected indicia;

FIG. 14 is an exploded perspective view of the stencil printer that mounts the selected indicia printing plate therein, and is adapted to be received on the platen of the FIG. 13 printer, for repetitive printing of the web of sealing material, prior to application thereof to a filled container;

FIG. 15 is a partially exploded, fragmentary perspective view of the cutting mechanism for severing the portion of the web or strip of closure material that has been utilized to seal a respective container at the sealing station, from the remainder of the supply of sealing strip material;

FIG. 16 is a partially broken perspective view of a lipped plastic container adapted for use in the apparatus of the invention;

FIG. 17 is a partial bottom view of the apparatus showing the mechanism for accomplishing powered indexing of the container support table of the apparatus in coordination with the other work mechanisms of the apparatus;

FIG. 18 is an enlarged, exploded view of the ratchet disc, the ratchet dog and the indexing plate of the indexing mechanism, taken from the opposite as that illustrated in FIG. 17, and FIG. 19 is an enlarged fragmentary, elevational view of the reverse link chain utilized to connect the indexing mechanism of FIGS. 17 and 18 to the power shaft of FIG. 5 for powering the indexing mechanism.

DESCRIPTION OF PREFERRED EMBODIMENT

Figure 1:
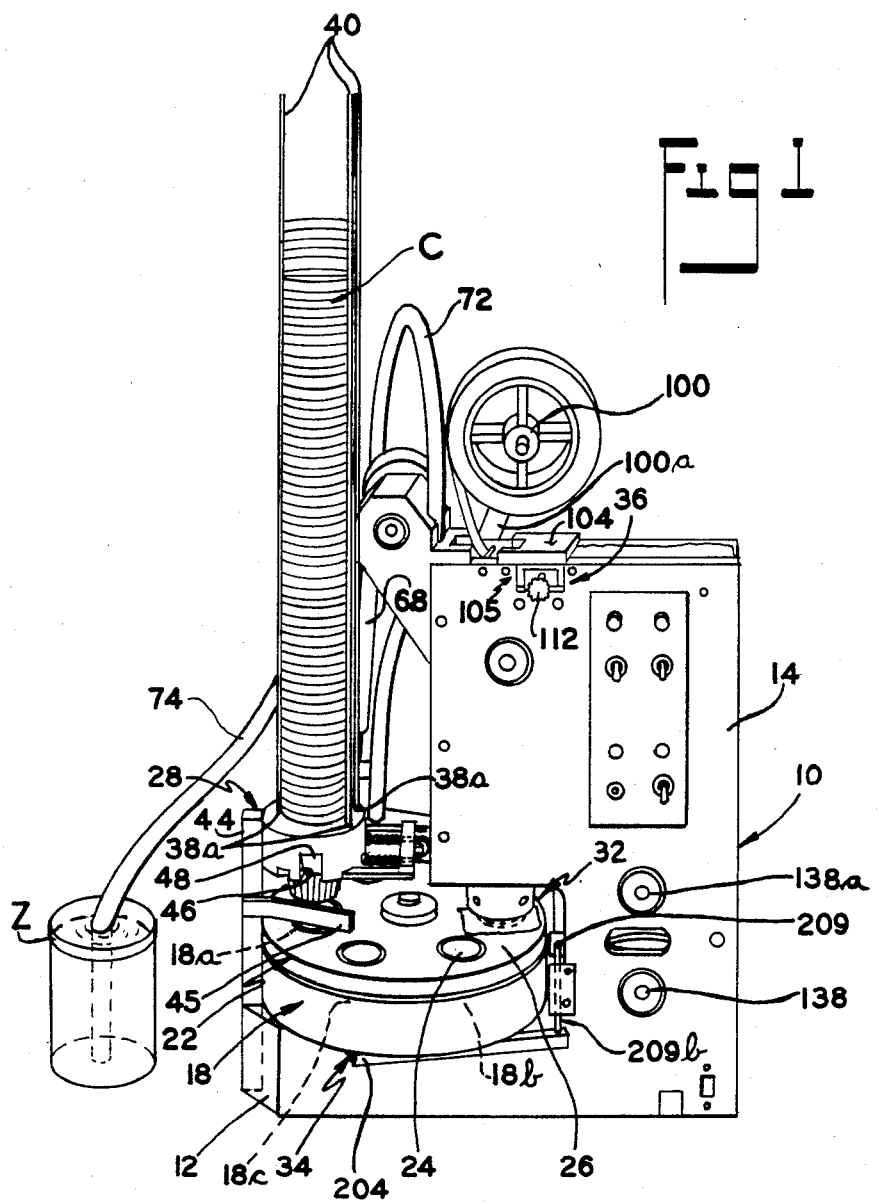
FIG. 1 is a generally, perspective, side view of a compact portable apparatus constructed in accordance with the invention.

Referring now again to the drawings and particularly to FIGS. 1, 2, 3 and 4, the portable packaging apparatus in the embodiment illustrated comprises a frame 10, including a base section 12 and spaced side wall sections 14, 14a. The side wall sections 14, 14a may be connected by cross members, including spaced ribs 16, making a generally rigid frame work for the apparatus. Stationary on the frame 10 is a base subplate 18, having an upwardly opening recessed section 18a, an upwardly sloped ramp section 18b, (FIG. 4) which merges at its upper boundary into a generally horizontal platform section 18c for reasons to be hereinafter set forth. Rotatably mounted as by means of vertical pin 20 on subplate 18, is container support plate 22.

Support plate 22 has a plurality of evenly spaced lipped openings 24 therein. In the embodiment illustrated there are provided six of such openings. The lipped portion of each opening 24 may be formed by the provision of a groove 25 in the top surface 26 of plate 22 circumscribing the respective opening 24. Openings 24 are adapted to receive therein lipped containers, such as for instance the container or cup C illustrated in FIG. 16. These containers may be formed for instance of high density polyethylene plastic or the like. The lip of the container C is adapted to overlie the lip on the respective opening 24 and the container C is adapted to be received generally loosely in the respective opening 24 and be supported therein by the lip portion of the container.

Mounted on the frame 10 and spaced about the rotatable support 22, are a plurality of work mechanisms forming work stations, for performing various work operations on the associated containers, for accomplishing the purpose of filling the containers or cups C with a substance, such as for instance, a liquid medication, and then sealing the filled container and facilitating removal of the filled and sealed containers from the support plate 22 of the apparatus.

In the embodiment illustrated such work stations include a feeding station 28, comprising mechanism for automatically feeding a stack of the containers C, one at a time, into a respective one of the openings 24 in the rotatable support plate 22, when in underlying relation with respect to the mechanism at station 28; a filling station 30 where the container as supported on plate 22 is filled with a predetermined amount of substance, such as the aforediscussed liquid medication; a sealing and cutting station 32 wherein flexible sealing material in web or strip form is heat sealed to the peripheral lips of the substance filled container and then cutting mechanism provides for severing the container engaging sealing portion of the closure strip from the remainder thereof; and a discharge station 34 for expediting removal of the filled and sealed container from the rotary support plate 22.

There is also preferably provided on the apparatus a printing station 36, where printing of the web of closure material is accomplished so that predetermined indicia may be printed on the heat-sealed closure top of the filled and sealed container.

Figure 2:
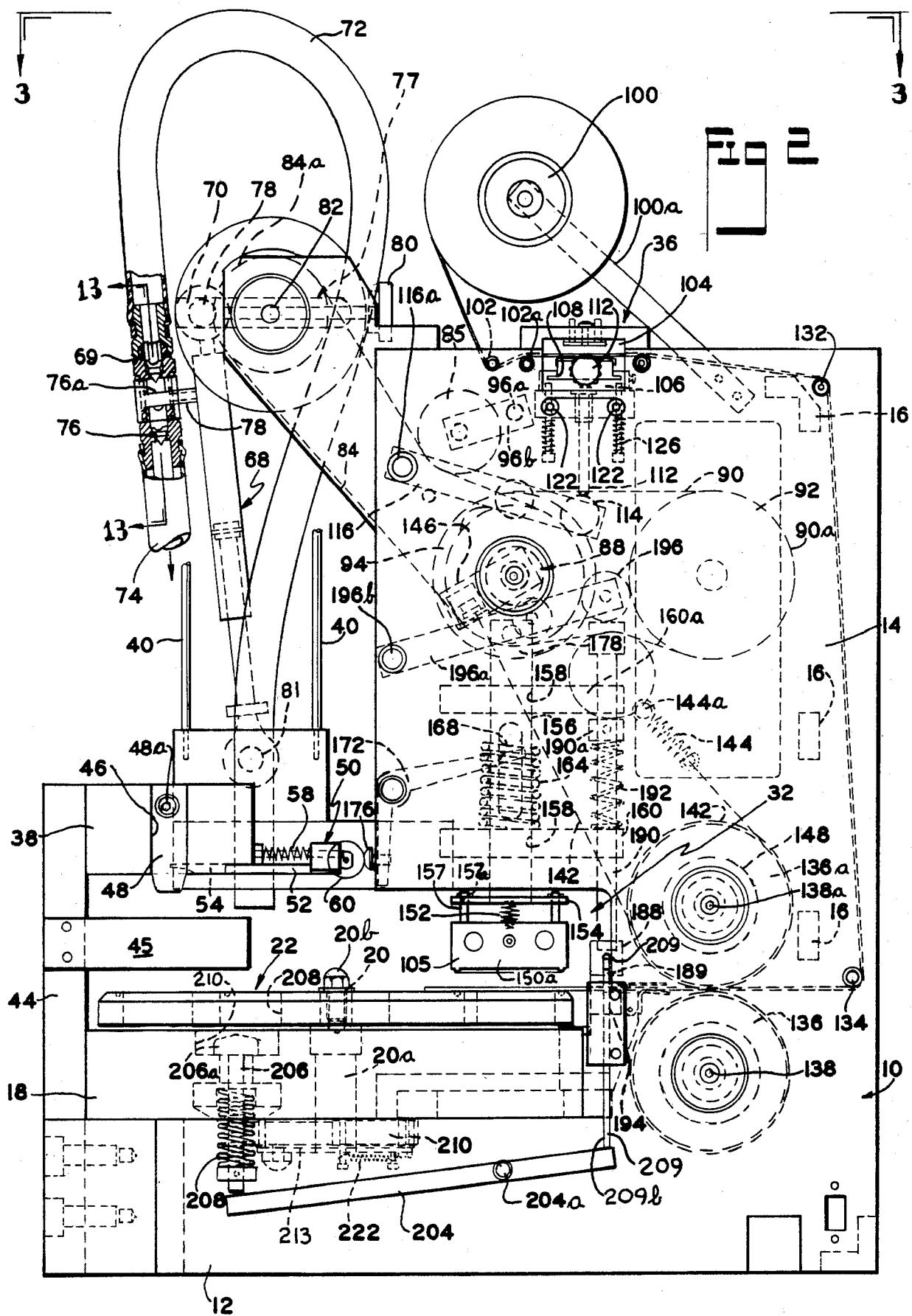
FIG. 2 is an enlarged side elevational view of the apparatus of FIG. 1, with the container feeding column at the feeding station having been partially deleted.
Figure 3:
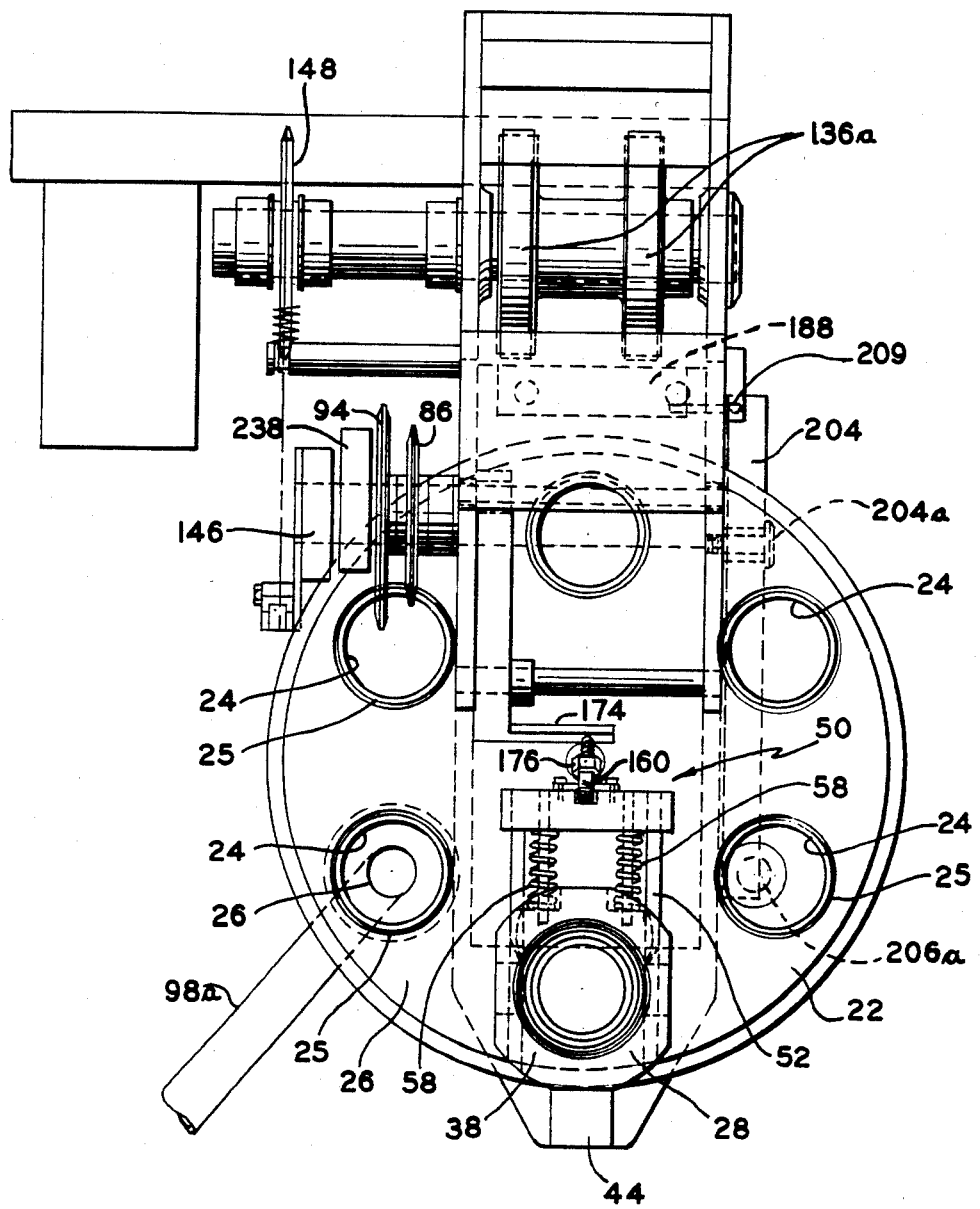
FIG. 3 is a top plan view of the apparatus of FIGS. 1 and 2, and with certain of the mechanism, including the mechanism for filling the containers with a liquid substance, having been deleted.

Feeding station 28, in the embodiment illustrated, comprises a tubular-like guide chute 38, having a plurality of openings 38a formed in the upper end thereof. Openings 38a are adapted to preferably removably receive a respective bar member 40 (FIG. 1) which guide and retain a stacked column of the plastic containers C (FIG. 16) and in general alignment with the circular opening 42 through guide member 38, for passage of the containers therethrough. Guide member 38 is secured to a post 44, which in turn is supported on base portion 12 of the apparatus (FIGS. 1 and 2). Post 44 is preferably provided with a guard arm 45 (FIG. 7) for a purpose to be hereinafter set forth.

Chute member 38 has generally vertically extending slots 46 formed in opposite sides thereof (FIGS. 7 and 8) in each of which is received a spring finger 48 (FIG. 10) secured therein as by means of fasteners 48a. These spring fingers are adapted to momentarily hold a cup or container C just prior to its being automatically released, to drop into the underlying opening 24 in the support plate 22, and as will be hereinafter described.

Coacting with chute member 38 is a reciprocal support-release member 50 (FIGS. 7-12). Support-release member 50 comprises a cross head 50a having a pair of arms 52 (FIG. 11) projecting laterally therefrom and adapted to be received in complementary slots 54 on the underside of chute 38, extending lengthwise from one side of the chute member to the opposite side thereof.

A pair of guide pins 56 project outwardly from chute 38 and extend into coacting relationship with complementary openings 56a extending through the cross head 50a of the support-release member 50. Compression springs 58 encircle and are supported on pins 56, and are adapted to urge member 50 outwardly away from chute 38. Cross member 50a has a follower in the form of roller 60 rotatably mounted on the outer side thereof (FIGS. 7–9) and adapted for engagement with an actuator for causing inward movement of the support-release member 50 relative to chute 38 and against the resistance to compression of springs 58. FIGS. 7 and 8 of the drawings illustrate the support-release member 50 in its released or outermost position as moved outwardly by the associated springs 58, while in FIG. 9 of the drawings, the member 50 is shown in its forced inward or container support position wherein the top surface of the arms 52 of member 50 extend into the chute opening 42 and prevent the bottommost container in the column of stacked containers from passing through the chute. In such inward position of member 50, the top surfaces 59 (FIG. 9) of the arms 52 are adapted to engage the underside of the lip of such bottommost container, to support the latter together with the associated column of containers, illustrated for instance in FIG. 1.

In such supporting or inward position of member 50 (FIG. 9) the arms 52 of the support-release member have previously engaged with the spring fingers 48 (FIG. 10) as it moved inwardly, and have forced the fingers laterally outwardly from their active position (shown in FIGS. 7 and 8) to an inactive position. In such inactive position of the fingers 48, the latter, which extend slightly below the bottom extremity of chute 38, and which normally extend into interfering relation with chute opening 42, have been moved outwardly by the arms 52, to permit a cup C to be released from held engagement with the finger, for falling into the underlying opening 24 in the support plate 22.

The inside surface 62 (FIG. 11) of the arms of member 50 have been contoured to generally correspond to or be slightly greater than the radius of a container or cup C at the maximum diameter of the container lip. When the springs 58 move member 50 outwardly away from chute 38 and into retracted position, the cut-away portions 62 of the arms permit the container being supported by surfaces 59 on the arms 52, to drop down past the arms 52, and through the opening 42 in member 38 to be engaged and retained by the spring fingers 48, but still retaining the remainder of the containers in column form and supported on the arms. Then upon the next inward cycle of the member 50 toward the chute 38, the full extent of the surfaces 59 of the arms are again disposed within the opening space 42 and continue to support the column of containers. During said next inward cycle movement, the cam surfaces 64 (FIG. 12) on the arms 52 engage with the slightly inwardly directed forward edge 66 on the respective spring finger, forcing the spring fingers apart as aforedescribed and permitting the aforementioned cup supported by the fingers 48 to drop down by gravity into the underlying opening in the rotary support plate 22 disposed below and in alignment with the opening 42 in the chute 38 of the feeding station.

Thus, the cups are fed as aforedescribed from the column of cups supported at the feeding station, one at a time, down into an underlying opening 24 in the rotary support table, with each deposited cup being supported by its lip, in opening 24.

Referring to FIG. 16, the plastic cups or containers C preferably embody spaced shoulder webs 66a adjacent the bottom interior thereof, for preventing the cups from nesting completely together when in columnar form at the feeding station 28, thereby facilitating their gravity separation and feeding down onto the underlying support plate 22.

It will be seen that at such feeding station 28, the opening 24 in rotary plate 22 is disposed above the recessed portion 18a on the sub-base 18, and therefore the cup as it drops into the underlying opening 24, is supported solely by the lip on the cup engaging the peripheral lip of the respective opening 24. Recess portion 18a is of sufficient depth so that the bottom of the container does not engage the bottom surface 67 of recess portion 18a.

The support plate 22 is then automatically indexed or rotated in a clockwise direction (as viewed in FIG. 3) moving the deposited cup from the feed station 28 to the left, until the cup is positioned at the next adjacent station, previously identified as the filling station 30 of the apparatus.

The filling station 30 includes a mechanism for dispensing a predetermined amount of the substance, such as for instance, liquid medication, that is to be inserted into the respective cup or container C. Such filling mechanism in the embodiment illustrated broadly comprises a pump syringe member 68 (FIGS. 2 and 3A) a check valve mechanism 69, an eccentric mechanism 70, and a filling tube 72, which preferably is translucent or transparent, and which is operable to transmit the liquid substance drawn into the syringe pump 68 and then emitted therefrom during the filling cycle, into an underlying container supported on the support plate 22, with the distal end of the tube 72 being disposed above the underlying upwardly opening receiving container or cup (FIG. 2).

Check valve mechanism 69 is coupled by means of a tube 74 to a source of the liquid substance, such as a container Z of the substance, (FIG. 1) so that the syringe pump can continually exhaust such substance from the source and insert it into the containers supported on the rotary support plate 22. Check valve mechanism 69 comprises a check valve 76 which is operable to permit the liquid to flow from the source up into the central chamber 76a of the check valve, and thence via the conduit 78 into the syringe pump 68, upon the intake stroke of pump 68. Check valve 82 of valve mechanism 69, during such intake stroke of the syringe pump 68, prevents the incoming liquid from passing into tube portion 72 of the filling station mechanism.

Upon the exhaust stroke of the syringe pump 68, the liquid is forced from the telescoping syringe pump through conduit section 78, past aforementioned check valve 82 (which is forced by the liquid pressure to open position) and into tube 72, to therefore force the liquid in the tube 72, downwardly into the underlying container at filling station 30. During such exhaust stroke of the syringe pump, check valve 76 (which is forced by the liquid pressure to closed position) prevents the liquid from pump 68 from passing back through tubing 74 to the source.

Means 77 is preferably provided for varying the liquid volume intake and liquid volume ejection of the syringe pump. In this connection, such pump is adjustably coupled at its upper pivot, as at 78, to the crank or eccentric 70 and an adjustable threaded adjuster 80 is provided on the eccentric, so that the throw of the eccentric can be selectively varied, with respect to the center of rotation of the eccentric. Thus if a greater volume intake and ejection is desired on the syringe pump 68, the adjuster 80 will be actuated to move the upper pivot point of the pump 68 to the eccentric 70 further outwardly toward the periphery of the eccentric. If a lesser volume intake is desired, the adjuster will be actuated to move connection 78 closer to the center of rotation of the eccentric 70. The bottom pivot 81 of pump 68 is preferably non-adjustable. The size of the pump syringe 68 may also be changed, (e.g. a larger or a smaller size syringe may be provided) and thus also changing the volume of liquid which is able to be drawn into the syringe pump and then emitted therefrom.

The crank or eccentric 70 is driven by means of a chain 84 coacting with a sprocket 84a secured to the crank, with such chain extending into coaction with pivotal idler sprocket 85 and then coacting with drive sprocket 86, fixed to rotatable main drive shaft 88, (FIG. 5) which in turn is driven by means of drive chain 90 coacting with sprocket 90a, which in turn is driven by constant speed electric motor 92 (FIG. 3A), mounted on side section 14a of frame 10. Chain 90 extending about sprocket 90a on drive shaft 88 thus continuously rotates shaft 88 during actuation of motor 92. Sprocket 90a may have a ratchet clutch of conventional type coacting between sprocket 90a and drive shaft 88, so as to insure that shaft 88 can be rotatably driven in only one direction. It will be seen that upon each rotation of the sprocket 84a driving eccentric 70, there is an intake and an exhaust cycle for the syringe pump 68, thus accomplishing one filling operation on an underlying container or cup C for each rotation of eccentric 70.

Filling station 30 preferably has a drain 98 provided in base plate 18 (FIGS. 3 and 3A) in underlying relation to the cup receiving opening in the rotatable support plate 22. In the event of any overflow or dripping of liquid at the filling station, it will be caught in the drain 98, and transmitted as for instance via coacting tube 98a, away from the apparatus to for instance, a waste sump or sanitary drain.

A supply of closure material is disposed, preferably in roll form on a spool 100 rotatably mounted on arm 100a extending diagonally upwardly from the frame 10. The web of closure material passes down from the spool 100 over guide rollers 102, 102a, (FIG. 2) and then passes between a backup plate 104 and a printer mechanism 105 at the printing station 36.

The printing mechanism 105 at printing station 36, in the embodiment illustrated, comprises a vertically movable platen 106 (FIGS. 1, 2 and 3) having a slotted passageway 108 therein, with such passageway being accessible from the exterior side of the frame of the apparatus and as illustrated in FIG. 2. A slidable stencil retainer member 110 (FIG. 14) having a removable friction or snap fitting cover 110a, is adapted for sliding insertion into slot 108 in the platen 106. Retainer member 110 preferably has a handle 112 attached thereto for facilitating the insertion and removal of member 110 into and from the movable platen. An ink pad 114 and stencil plate 114a, is adapted to be received within the defined recess 116 in the stencil retainer member 110, and then the cover 110a is adapted to fit in snug frictional contact with the exterior side walls 117 of member 110, to retain the stencil plate and associated ink pad in position, after which the member 110 assembly is adapted for insertion into the platen 106. The web closure material is adapted to pass between the top of the stencil and the backup plate, and upon upward movement of the platen 106 against the backup plate 104, the closure web is imprinted with the selected indicia on stencil 114a.

Vertical movement of the platen 106 of the printer mechanism is accomplished by means of downwardly extending vertical stem 112 of the movable platen, with the stem 112 adapted for engagement with cam follower roller 114 (FIGS. 2 and 13) mounted on vertically pivotal bar 116, pivoted as at 116a to the frame 10. Support plate 120 secured as by means of fasteners 122 to the frame 10, supports the movable platen, and studs 124 secured to the movable platen on the underside thereof, extend through openings in the support plate 120. Springs 126 coact with studs 124 and support plate 120, for resisting the upward movement of the platen 106 and associated stencil with respect to the stationary support plate 120.

Upward movement of the actuator 116 and associated cam roller 114, the latter engaging the pin 112 on the platen, forces the platen and associated stencil upwardly against the resistance to the compression springs 126, and causes the printing of the selected indicia on the overlying web of closure material. Actuator 116 is caused to move upwardly by means of cam 128 adjustably secured, as by a set screw 128a, to the aforementioned power shaft 88, engaging cam roller 127 on actuator bar 116. Thus cam 128 causes an imprinting operation every time rotation of power shaft 88 occurs.

As can be best seen in FIG. 13, a stop pin 129 is preferably provided in slot 108 in the movable platen 106 for limiting the inward movement of the stencil insert 110, and an adjustable ball detent 130 is also preferably provided, for releasably "locking" the stencil insert member 110 in place whem member 110 is inserted fully into the slot recess 108 in the platen.

The web of closure material from spool 100 continues along the top of the apparatus as illustrated in FIG. 2, and passes about roller 132, and then down vertically down the rear of the apparatus to extend about roller 134, and then is directed inwardly toward the drive rollers 136, 136a to pass therebetween. Drive rollers 136, 136a pull the web of closure material from the roll on top of the apparatus and push it over an underlying container or cup C on support 22 at the aforementioned sealing and cutting station 32, wherein the flexible sealing material is heat-sealed to the peripheral lip of the filled container.

In the embodiment illustrated, the upper and lower drive rollers 136, 136a each comprise a pair of laterally spaced rollers so that the web of material is engaged primarily at its outer edges, by the pairs of upper and lower drive rollers 136, 136a. The bottom pair of drive rollers 136, is preferably rubber coated on their peripheries and are secured to a rotatable shaft 138 mounted on frame 10, while the top pair of drive rollers 136a are secured to an upper shaft 138a (FIGS. 2 and 6) rotatably mounted on frame 10, with the peripheral surfaces of the drive rollers 136a preferably being scored or knurled to increase the frictional gripping of the closure web.

Rollers 136, 136a are preferably adjustably mounted on the associated shaft for adjustment lengthwise of the respective shaft, and in the embodiment illustrated as by means of releasable collars 140. Shaft 138a has a sprocket 142 preferably adjustably secured (lengthwise thereof) thereto and which is adapted to be driven by means of a coacting chain 144 (FIGS. 2 and 3a), one end of which is attached to a lost motion spring 144b, which in turn in anchored as at 144a to the machine frame, and with the other end of chain 144 pivotally coupled to crank arm 146, as at 146a, which is secured to aforementioned power shaft 88.

Sprocket 142 on shaft 138a is attached to the shaft by means of a one way clutch 148 (FIG. 6) so that every rotation of power shaft 88 will cause clockwise, as viewed in FIG. 2, rotary motion of the sprocket 142 and associated clutch 148, thus causing clockwise rotation of the shaft 138a, and thus advancing via rollers 136, 136a, the web of closure material. Lost motion spring 144b will maintain the tension of the drive chain 144 and causes ratcheting of the one-way clutch 148 in a counterclockwise direction, preparatory to the next drive cycle for the drive rollers 136, 136a.

The paper web is fed out by the rollers 136, 136a over the top of a substance containing cup or container C supported on the support plate 22, with such container having been previously filled with the substance at the filling station 30.

The sealing head 150 at the sealing station 32 comprises in the embodiment illustrated an electrically heated head block 150a of generally circular configuration (FIGS. 2 and 4) which is preferably resiliently mounted for vertical movement, as by means of spring 152, relative to anchor plate 154 attached to the vertically extending stem 156 of the sealing head. The head block includes upstanding guide pins 157 extending through openings 158 in anchor plate 154 for guiding the vertical movement of the heated head block relative to plate 154. Abutments 157a on pins 157 limit downward movement of the head block relative to the plate 154. Sealing head 150, including stem 156 are supported on horizontal cross plate 160 for vertical movement with respect thereto. A cross pin 162 extends through an opening in stem 156 (FIG. 4) with a spring 164 being provided coacting with pin 162 and stationary abutment plate 160 for movably supporting the sealing head on apertured plate 160. The cross pin 162 extends through guide slot 166 in vertical side plate 14a (FIG. 4) for preventing rotation of the sealing head structure. Spring 164 yieldingly resists downward movement of the sealing structure 150 relative to cross plates 160, 160a. Pin 162 extends through slot 166 in the vertical side plate 14a and at its distal end is adapted for engagement with crank lever 172 (FIGS. 2 and 4) pivoted as at 172a to the frame 10, with such crank lever having an elongated transverse horizontal arm portion 174, with a projecting horizontally adjustable abutment button 176 thereon. A screw thread connection of the button 176 to arm portion 174 provides, in the embodiment illustrated, for said adjustment.

Button 176 is adapted for actuating engagement with the follower roller 60 on the aforementioned support-release member 50, upon predetermined downward movement of the sealing head assembly, to seal an underlying filled container and thus at the same time, causing release of an empty container at the feeder station 28, and as was previously described.

Stem 156 of sealing assembly 150 has a cam roller 178 (FIG. 4) on the upper end thereof, which is adapted for engagement with cam 180 preferably adjustably mounted on the power shaft 88 (FIG. 5) as by means of threaded set screws 182. Thus it will be seen, every rotation of the power shaft 88 causes the cam 180 to rotate with the shaft and engage the cam roller 178 on the sealing head 150, to cause downward movement of the sealing head assembly and into engagement with the web of closure material overlying the underlying filled container. The sealing head 150 with its resiliently mounted heater head portion 150a, yieldingly engaging the closure material, causes a heat-seal of the closure material to the peripheral rim of the container, thus sealing the latter.

The closure material is preferably a laminate of polyester coated paper and foil, known in the trade as lidding stock. The paper is of a sufficient grade to allow printing thereon at the printing station 36, and the foil is preferably coextruded with a copolymer, such as for instance "Saran", and is of sufficient thickness to form a matrix-like bond between the peripheral lip of the plastic container and the multilaminate closure material, but at the same time a bond that is able to be expeditiously peeled back from the container, to permit opening of the same when it is desired to utilize the contents of the container.

The temperature of the heater head 150a is preferably adjustable from about 300° to about 600° F. so that different types of closure material are utilizable with the apparatus, but preferably an operating temperature of between approximately 400°-600° F. is desired when utilizing the aforedescribed lidding stock and cups or containers C of high density polyethylene plastic, to obtain the optimum sealing of the closure material to the lip of the container.

A rheostat 184 (FIG. 3a) of standard known type is provided for permitting close control of the temperature of the heating head 150a, so that such temperature can be varied and maintained within very close limits, as for example 5° to 7° F.

After sealing of the filled container at the sealing station 32, it is desired to sever the sealed portion of the web of closure material from the remainder of the web. In this connection, there is provided a cutter mechanism 186 (FIG. 15) for accomplishing such severing operation. Such cutter mechanism 186 in the embodiment illustrated comprises a cutter head 188 having means for removably securing a cutter blade 189 thereto, with said head being mounted on vertically extending stems 190 connected at their upper ends with cross-piece 190a. Springs 192 encircle the respective stem and engage an adjustable collar member 192a movably secured to the respective stem. The lower end of the spring is adapted for engagement with the aforementioned cross support plate 160 of the frame 10, to thus resiliently support the cutter mechanism on the support plate 160 for vertical movement with respect thereto.

The cutter blade 189 on the cutter mechanism is adapted for engagement with an underlying resilient (e.g. rubber) back-up block 194 mounted on base 12 of the apparatus, for providing for severing of the closure material W upon predetermined downward movement of the cutter mechanism.

The cutter mechanism is driven downwardly by means of follower 196 on pivotal arm 196a engaging the cross-piece 190a, with the arm 196a being pivoted as at 196b to the frame. Arm 196a is moved or pivoted in a generally vertical plane by means of follower 198 which is engaged by cam 200 adjustably secured to the aforementioned power drive shaft 88 (FIG. 5). Thus it will be seen that upon every rotation of the drive shaft 88, the cam 200 thereon engages cam 198 driving the arm 196a downwardly to actuate the cutter mechanism, and sever the underlying web of closure material from the portion thereof which is sealed to the associated container.

As can be best seen in FIG. 15, the cutter blade 189 is adapted to engage in recess portion 194a of the cutter block 194, and thus passes completely through the web of closure material. Upon termination of the downward movement of arm 196a due to the rotation of the drive shaft 88, the springs 192 on the cutter mechanism drive the cutter mechanism and blade upwardly and while so moving, engage the leading lip L of the cut web W of closure material, thus causing it to "curl" or be lifted generally upwardly as illustrated in FIG. 15, preparatory to movement of the web of closure material over the next container to be sealed. Bracket 202 is preferably adjustably mounted on the base cutter block and limits the upward lifting movement of the leading end of the web of closure material.

The filled and sealed container having been severed from the remainder of the web of closure material, is then indexed or moved by the support plate 22 from the sealing and cutting station, by the rotation of the support plate 22. As can be seen in FIG. 4, as the support plate 22 rotates about the shaft 20a, it causes engagement of the underside of the sealed container with the upwardly sloped ramp portion 18b of the base plate 18. As the support plate 22 continues to rotate, the filled and sealed container is pushed upwardly relative to its opening 24 in the support plate, and to discharge station 34, where the sealed container is supported on the platform section 18c, and in general alignment with the discharge station 34.

Discharge station 34 includes mechanism for urging the container out of its associated opening in the support plate sufficiently so that it can tumble or fall away from the apparatus, and off of the support plate 22. Such mechanism comprises a pivotal arm 204, pivoted as at 204a (FIG. 4) to the base 12 of the apparatus, and having a generally upright ejector stem 206 which extends through an opening 208 in the base plate 18, and in underlying relationship to the respective opening 24 in the support plate in which is disposed the sealed container. The stem 206 may be provided a head portion 206a which is adapted to engage the underside of the overlying container and tipped it laterally away from the support plate 22, where it falls by gravity over the edge thereof into for instance, a receiving basket (not shown) which could be disposed adjacent the apparatus. A spring 208 is preferably provided coacting with the stem 206 for urging the stem and associated head downwardly below the upper level of head opening 210 in base 18, and for maintaining engagement between stem 206 and arm 204. As can be best seen in FIG. 3, the head 206a is preferably off-set from the axis of opening 24 at the discharge station so that the sealed container will be caused to tip or be ejected laterally outwardly of the apparatus.

Actuation of the arm 204 is accomplished by means of linkage connected to the cutter mechanism 186 so that upon the downward movement of the cutter bar of the cutter mechanism, discharge mechanism is actuated to kick out the container which is disposed at the discharge station 34. Such linkage can be best seen in FIGS. 15 and 2 and comprises a linkage 209 (preferably formed in two sections 209a and 209b) connected to the cutter head 188 and likewise engageable to the underlying end of the pivot arm 204, for rocking the pivot arm upon downward movement of the cutter head 188, and thus moving head 206a of stem 206 above the level of opening 210.

The indexing of the support plate 22 may be accomplished in the following manner: The post 20a to which the support plate 20 is secured as by means of fastener 20b, extends through the central opening in the base plate 18, and at its distal end has a ratchet gear 210 (FIGS. 17 and 18) which is secured to the post 20a as by means of set screw 212, thus making the gear 210 integral with the post 20a and the rotary support plate 22. Rotatably mounted on the post 20a is an escapement latch plate 213, having a dog 214 pivoted thereto as at 214a, and adapted to coact with the gear 210 and to rotate the gear and attached support plate 22, when the dog is disposed in one of the slots in the gear. Dog 214 has a pin 218 projecting therefrom and extending through an elongated slot 220 in the escapement plate 213, and a spring 222 coacting between the pin 218 and an anchoring point 224 on the plate 213, urges the dog into coacting relationship with gear 210. Escapement plate 213 has a drive chain 225 pivotally coupled thereto as at 226, at a corner thereof generally opposite the pivotal dog 214. The other end of the plate 213 has a return spring 228 with one end coupled to the escapement plate 213, and the other end anchored to the frame 10, thus providing for returning the escapement plate back to the position illustrated in FIG. 17 after indexing movement of the indexing mechanism, to cause rotation of the rotary support table 22.

The aforementioned drive chain 225 preferably passes about rollers 230 so as to keep the chain away from frame obstruction. The other end of the chain 225 is attached as at 23 (FIG. 5) to drive bar 232 pivoted as at 234 to the frame 10 of the apparatus, with the drive bar 232 having a roller follower 236 thereon adapted for engagement by cam 238 preferably adjustably mounted on power shaft 88, to thus cause pulling actuation on the chain 235.

As the chain is pulled by rotation of the drive shaft 88, the chain pulls on and rotates the escapement plate 213, and the dog latch is pulled into engagement by means of the spring 222 with one of the six teeth in the indexing gear, and drives the turntable 22 around to the next position. The return spring 228 then returns the escapement mechanism to the next tooth position for subsequent indexing of the turntable. Thus the turntable 22 is indexed around to each of its six positions at a respective work station, for carrying out of the work operations on the container. A plastic (e.g. Nylon) plug 239 may be provided extending through pin 20a and adapted for friction engagement with the defining surface of the opening in base 18 receiving the pin 20a, to act as a braking mechanism for turntable 22, to ensure proper positioning thereof as occasioned by the indexing mechanism.

FIG. 19 is a fragmentary illustration of the chain utilized to drive the indexing mechanism, and it will be noted that it comprises one portion in which the links are disposed in one plane and another portion which is connected as at 240 to the first portion, and wherein the links are disposed in another plane, so that the chain operates properly as it passes around the guide rollers 230 on the apparatus frame, and without twisting of the chain links.

The drive shaft may be provided with a projection 244 extending laterally of the shaft 88 (FIG. 5) and adapted for actuation of a counter (not shown) so that a record can be readily kept of the number of filled and sealed containers produced on the apparatus. The counter can have visible indicia thereon, for observation by the operator, so that the substance being filled into the containers can be changed or the apparatus stopped (by deenergizing the motor 92) when the desired number of filled and sealed containers are produced.

From the foregoing discussion and accompanying drawings it will be seen that the invention provides a novel, compact portable apparatus for filling open ended preformed containers with a substance, such as for instance a liquid, and then operable for heat bonding a thin flexible closure material to the periphery of the open end of the container, thus sealing the latter; and an apparatus especially adapted for use in providing packaged medicines. The invention also provides a novel, compact, apparatus adapted for providing a variety of volume filling operations for containers, and wherein the apparatus comprises a rotatable support for a plurality of the liquid material receiving containers thereon, and with a plurality of work stations on the apparatus including a filling station, and associated mechanism and a sealing station and associated mechanism, coacting with the support, together with means for automatically indexing, filling, and sealing of the containers at the respective work stations, and subsequent removal thereof from the apparatus.

The terms and expressions which have been used, are used as terms of description and not of limitation, and there is no intention in the use of such terms and expressions of excluding any equivalents of the invention shown or claimed, or portions thereof, and it is recognized that various modifications are possible within the scope of the invention claimed.

What is claimed is:

1. A compact portable apparatus for filling an open-ended container with a substance, such as a liquid medication, and then heat sealing a thin flexible closure material to the periphery of the open end of the container to seal the latter, comprising a frame, a rotatable support mounted on said frame adapted to receive a plurality of the containers, a plurality of work stations on said frame adapted for coaction with said support, said work stations including means for inserting some of the substances into a container at one of said stations and comprising a container filling station, means for applying the closure material to the periphery of the substance filled container at another of said stations and comprising a container sealing station, means coacting with said support for facilitating removal of sealed containers from the support at a discharge station, and means for automatically indexing said support through a predetermined cycle, including rotary movement from said filling station to said sealing station, and thence to said discharge station, and including means for automatically feeding containers onto said support upon said indexing of said support about its axis and comprising a feeding station, and wherein said automatic container feeding means comprises a chute member, reciprocal container support-release means coacting with said chute member and adapted for generally transverse movement relative to the lengthwise axis of said chute member, and wherein in one position of said support-release means, being operable for retaining a stack of containers in positional relationship with respect to said chute member, and in another position of said support-release means adapted to cause gravity release of a lowermost container in the stack, and spring finger means normally coacting with said chute member in interfering relation to gravity movement of containers past said chute member, for momentarily holding the released lowermost container from dropping onto said support, until said support-release means moves from said other position back towards said one position, to thereby cause deactivation of said finger means by forcing the latter outwardly out of said normal interfering relation with the momentarily held container to thereby permit dropping of the latter onto said support.

2. An apparatus in accordance with claim 1 wherein said support comprises a rotatable platform having openings in the upwardly facing surface thereof of a size adapted to relatively loosely receive a respective lipped container and to support such respective lipped container on the lip portion thereof.

3. An apparatus in accordance with claim 2 including wheeled drive means disposed adjacent said rotatable support for engaging with and moving a strip of the flexible sealing material over a container at said sealing station, and means for actuating said drive means in conjunction with said indexing of said support, whereby the flexible sealing material is applied over the open end of the respective container at the sealing station when the rotary support is at rest in its rotary movement.

4. An apparatus in accordance with claim 3 including means for mounting a rotatable roll of the closure material on the apparatus, and means for threading a strip of the closure material emanating from said roll through the apparatus to said drive means.

5. An apparatus in accordance with claim 2 wherein said indexing means includes means for rotatably actuating said rotary support in predetermined increments to sequentially position the openings therein in generally aligned relation with respect to said stations, and in generally aligned relation with said substance insertion means and said closure material applying means.

6. An apparatus in accordance with claim 2 including groove means circumscribing the respective opening in said rotary support, with said groove means defining a lip about the respective opening adapted to receive thereon a peripheral lip of a respective open-ended-lipped container, for supporting the container, and said sealing station comprising a heater head adapted for vertical reciprocation, and when in lowered operative position being adapted to press the closure material against the peripheral lip of the container as supported by the lip on the respective opening in said support, so as to adhere the flexible closure material to the peripheral lip of the container.

7. An apparatus in accordance with claim 6 including means for severing a strip of the closure material after it is applied to the open end of respective container at said sealing station preparatory to further indexing of said support.

8. An apparatus in accordance with claim 1 wherein said filling station includes a filling tube supported by bracket means, and means providing for automatic filling of said tube with substance to be subsequently inserted into a container at said filling station, the last mentioned means including means adapted for coaction with an associated source of the substance for eventual entry into said filling tube.

9. An apparatus in accordance with claim 8 including means for coordinating actuation of said filling tube in conjunction with said indexing actuation of said support, so that said insertion operation occurs while said support is stationary, and prior to said rotary movement of said support from said filling station to said sealing station.

10. An apparatus in accordance with claim 9 wherein said coordinating means includes a rotatable shaft mounted on said frame, power means for rotating said shaft at constant speed, and means coacting between said filling tube and said shaft for causing actuation of said automatic filling means upon predetermined rotation of said shaft.

11. An apparatus in accordance with claim 8 wherein said last mentioned means comprises a syringe pump and a check valve coupled to said pump, with said check valve being disposed intermediate the source of the substance to be inserted into the containers and said filling tube, means operating said pump for causing the pump to withdraw some of the substance from the source into the pump, upon extension of the pump, and to be ejected from the pump into the filling tube upon contraction of the pump, with said check valve permitting the flow of the substance from the source into the pump during the intake cycle of the pump, and permitting exiting of the substance from the pump to said filling tube during the exhaust cycle of the pump.

12. An apparatus in accordance with claim 11 wherein said pump is actuated by means of an eccentric drive from a power source, and means for adjusting the throw of the eccentric so as to provide means for varying the volume intake and discharge of said syringe pump.

13. An apparatus in accordance with claim 1 including ramp means disposed beneath said rotatable support, adapted for engagement with the bottom of a container as said support rotates from said sealing station toward the next station, to provide for raising a filled and sealed container upwardly relative to the upper surface of said support for convenient removal therefrom of the filled and sealed container.

14. An apparatus in accordance with claim 1 including means for automatically ejecting filled and sealed containers from said support at said discharge station.

15. An apparatus in accordance with claim 1 wherein said support-release means comprises a pair of spaced arms movable through slots in said chute member, with each said arms adjacent its distal end having thereon a radial edge of a configuration generally similar to the configuration of a peripheral segment of the container, so that the container is able to move by gravity past said spaced arms onto said finger means upon predetermined transverse movement of said support-release means with respect to said chute member.

16. An apparatus in accordance with claim 1 wherein said support-release means is spring biased so as to be urged away from said chute member, and means for urging said support-release means in a direction towards said chute member responsive to movement of said support, whereby containers are sequentially released from said chute member onto said support at said feeding station.

17. An apparatus in accordance with claim 1 wherein said means for applying closure material to the periphery of a container comprises a spring-loaded heater head adapted for vertical reciprocation and when in lowered operative position being adapted to heat seal the closure material to the periphery of the open end of a container at said sealing station, and means for selectively varying the temperature of said heater head.

18. A compact portable apparatus for filling an open-ended container with a substance, such as a liquid medication, and then heat sealing a thin flexible closure material to the periphery of the open end of the container to seal the latter, comprising a frame, a rotatable support mounted on said frame adapted to receive a plurality of the containers, a plurality of work stations on said frame adapted for coaction with said support, said work stations including means for inserting some of the substance into a container at one of said stations and comprising a container filling station, means for applying the closure material to the periphery of the substance filled container at another of said stations and comprising a container sealing station, means coacting with said support for facilitating removal of sealed containers from the support at a discharge station, and means for automatically indexing said support through a predetermined cycle, including rotary movement from said filling station to said sealing station, and thence to said discharge station, and including means for automatically feeding containers onto said support upon said indexing of said support about its axis and comprising a feeding station, and wherein said automatic container feeding means comprises a chute member, reciprocal container support-release means coacting with said chute member and adapted for generally transverse movement relative to the lengthwise axis of said chute member, and wherein in one position thereof being operable for retaining a stack of containers in positional relationship with respect to said chute member, and in another position thereof being adapted to cause gravity release of a lowermost container in the stack, and spring finger means normally coacting with said chute member in interfering relation to gravity movement of containers past said chute member for momentarily holding the released lowermost container from dropping onto said support, until said support-release means moves from said other position back towards said one position, to thereby cause deactivation of said finger means, and wherein said support-release means comprises a pair of spaced arms movable through slots in said chute member with each said arms having thereon a radial edge of a configuration generally similar to the configuration of a peripheral segment of the container, so that the container is able to move by gravity past said spaced arms onto said finger means upon predetermined transverse movement of said support-release means with respect to said chute member towards said other position, and wherein said arms on said member include cam surfaces for moving said finger means outwardly relative to said chute member to thus cause said deactivation of said finger means and release the associated container being retained by said finger means, and permit it to drop by gravity onto said support at said feeding station.

19. An apparatus in accordance with claim 18 including printing means for automatically printing indicia on said closure material.

20. A compact portable apparatus for filling an open-ended container with a substance, such as a liquid medication, and then heat sealing a thin flexible closure material to the periphery of the open end of the container to seal the latter, comprising a frame, a rotatable support mounted on said frame adapted to receive a plurality of the containers, a plurality of work stations on said frame adapted for coaction with said support, said work stations including means for inserting some of the substance into a container at one of said stations and comprising a container filling station, means for applying the closure material to the periphery of the substance filled container at another of said stations and comprising a container sealing station, means coacting with said support for facilitating removal of sealed containers from the support at a discharge station, and means for automatically indexing said support through a predetermined cycle, including rotary movement from said filling station to said sealing station, and thence to said discharge station, and wherein said support comprises a rotatable platform having openings in the upwardly facing surface thereof of a size adapted to relatively loosely receive a respective lipped container and to support such respective lipped container on the lip portion thereof, and wherein said means for automatically indexing said support comprises a ratchet, including a ratchet gear secured to a support shaft of said support, said ratchet including a latch plate, a dog pivoted to said latch plate and adapted for engagement with slots in said ratchet gear, means spring loading said dog, so as to urge it toward and into engagement with the periphery of said ratchet gear, and anchoring means on said latch plate adapted for connection to a pull member, such as a flexible chain, for causing pivotal movement of said latch plate about said support shaft, and spring means for returning said latch plate to its original position upon release of the pulling force from said pull member.

21. An apparatus in accordance with claim 20 wherein said ratchet gear includes means for releasably locking said gear to said support shaft.

* * * * *